(12) United States Patent
Miao

(10) Patent No.: US 12,181,058 B2
(45) Date of Patent: Dec. 31, 2024

(54) CYLINDER VALVE

(71) Applicant: Grand Gas Equipment Incorporation, Taichung (TW)

(72) Inventor: John Miao, Taichung (TW)

(73) Assignee: GRAND GAS EQUIPMENT INCORPORATION, Taichung (TW)

( * ) Notice: Subject to any disclaimer, the term of this patent is extended or adjusted under 35 U.S.C. 154(b) by 0 days.

(21) Appl. No.: 18/313,418

(22) Filed: May 8, 2023

(65) Prior Publication Data
US 2024/0376989 A1 Nov. 14, 2024

(51) Int. Cl.
F16K 15/06 (2006.01)
F16K 1/30 (2006.01)
F16K 1/46 (2006.01)

(52) U.S. Cl.
CPC ............ F16K 15/063 (2013.01); F16K 1/303 (2013.01); F16K 1/46 (2013.01)

(58) Field of Classification Search
CPC .......... F16K 1/303; F16K 1/46; F16K 15/063; F16K 15/065; F16K 3/267; F16L 37/42
See application file for complete search history.

(56) References Cited

U.S. PATENT DOCUMENTS

| | | | | |
|---|---|---|---|---|
| 2,206,356 A * | 7/1940 | Hutchings | ............. | F16K 15/063 137/538 |
| 3,566,918 A * | 3/1971 | Rauen | .................. | F16L 37/113 137/614.04 |
| 4,257,443 A * | 3/1981 | Turney | .................. | F16K 15/063 137/454.2 |
| 6,877,525 B2 * | 4/2005 | Fischer | ..................... | F16K 1/12 137/538 |
| 7,128,088 B2 * | 10/2006 | Andersson | ............ | F16K 15/063 251/297 |
| 9,505,334 B2 * | 11/2016 | Maness | .................... | B60P 7/065 |
| 9,810,332 B2 * | 11/2017 | Chapman | ................ | F21V 31/03 |
| 10,865,884 B2 | 12/2020 | Newman et al. | | |

FOREIGN PATENT DOCUMENTS

GB 2099944 A * 12/1982 ............ F16L 37/252

* cited by examiner

Primary Examiner — Hailey K. Do
(74) Attorney, Agent, or Firm — MUNCY, GEISSLER, OLDS & LOWE, P.C.

(57) ABSTRACT

A cylinder valve includes a valve body, a valve pin, and an elastic biasing member. The valve body includes a distal chamber, a proximal chamber disposed along a main axis, and an intermediate chamber extending along the main axis between the distal chamber and the proximal chamber. The valve pin is movably arranged through the distal chamber, the proximal chamber and the intermediate chamber and is movable along the main axis between a closed position and an open position. The elastic biasing member is arranged in the distal chamber and is configured to elastically bias the valve pin towards the closed position.

6 Claims, 5 Drawing Sheets

CYLINDER VALVE

BACKGROUND OF THE INVENTION

The present invention relates to a cylinder valve and, more particularly, to a cylinder valve for use with a cylinder containing gas.

U.S. Pat. No. 10,865,884 discloses a cylinder valve assembly includes a valve pin spring disposed between the spring seat and the valve pin, thereby resiliently-biasing the valve pin toward its closed position. This resilient bias may be configured to be overcome by application of an axial force by a connector probe. The probe seal is configured to create a fluid seal between the connector probe and the wall of the probe chamber.

However, the cylinder valve mentioned above requires the installation of the valve pin spring by setting up a spring seat separately. The spring seat is press-fit or threaded into the proximal chamber, which not only increases the number of parts but also the corresponding processing and assembly steps, resulting in an increase in manufacturing costs. In addition, the valve pin spring is constantly compressed without restriction, which may easily cause fatigue failure.

Thus, a need exists for a cylinder valve to mitigate and/or obviate the above disadvantages.

SUMMARY OF THE INVENTION

An objective of the present invention is to provide a cylinder valve that includes a valve body, a valve pin, and an elastic biasing member. The valve body includes a distal chamber, a proximal chamber disposed along a main axis, and an intermediate chamber extending along the main axis between the distal chamber and the proximal chamber. The valve pin is movably arranged through the distal chamber, the proximal chamber and the intermediate chamber and is movable along the main axis between a closed position and an open position. The elastic biasing member is arranged in the distal chamber and is configured to elastically bias the valve pin towards the closed position.

In an embodiment, the distal chamber defines a first inner diameter radially along the main axis. The proximal chamber defines a second inner diameter radially along the main axis. The intermediate chamber defines a third inner diameter radially along the main axis. The third inner diameter is smaller than either the first inner diameter or the second inner diameter to form a shoulder between the distal chamber and the proximal chamber. At least one end of the elastic biasing member elastically abuts against the shoulder along the main axis.

In an embodiment, the valve pin defines a distal end and a proximal end opposite to the distal end along the main axis. The distal end is arranged in the distal chamber. The proximal end is arranged in the proximal chamber. A limiting member is connected to the distal end of the valve pin. The elastic biasing member defines a first end and a second end opposite to the first end along the main axis. The first end of the elastic biasing member abuts against the limiting member. The second end of the elastic biasing member abuts against the shoulder.

In an embodiment, the valve pin has a threaded portion disposed on an outer peripheral surface of the distal end. The limiting member has a threaded hole extending along the main axis. The threaded portion of the valve pin is threaded connected with the threaded hole of the limiting member.

In an embodiment, the limiting member has a head and a body connected to the head along the main axis. The threaded hole penetrates through the head and the body along the main axis. The first end of the elastic biasing member abuts against the head of the limiting member, and wherein the body abuts against the shoulder when the valve pin is in the open position.

In an embodiment, the elastic biasing member is a compression spring.

In an embodiment, the elastic biasing member defines an initial length along the main axis. The body defines a limiting length along the main axis. The limiting length is smaller than the initial length.

In an embodiment, the elastic biasing member is configured to have a compressed length along the main axis after being subjected to a force. The limiting length is equal to the compressed length.

In an embodiment, the valve pin is provided with a vent hole. The vent hole includes a radial section radially extending along the main axis and an axial section extending along the main axis. The radial section communicates with the intermediate chamber, and communicates with the proximal chamber when the valve pin is in the open position. The axial section communicates with the threaded hole and the distal chamber.

In an embodiment, the valve pin is provided with a sealing member at the proximal end. The sealing member abuts against the shoulder when the valve pin is in the closed position.

The present invention will become clearer in light of the following detailed description of illustrative embodiments of this invention described in connection with the drawings.

DETAILED DESCRIPTION OF THE INVENTION

Figure 1:
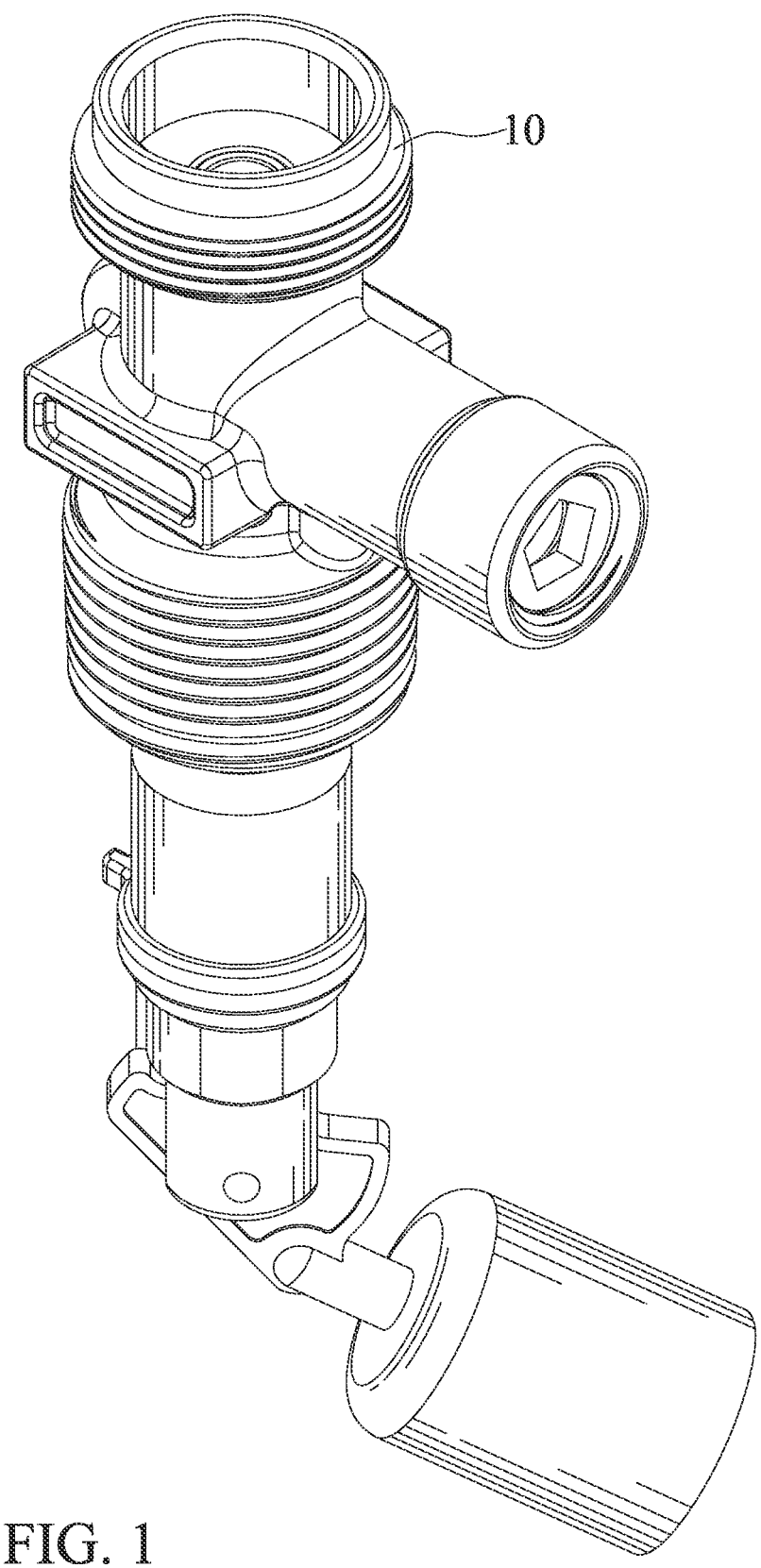
FIG. 1 is a perspective view of a cylinder valve of an embodiment according to the present invention.
Figure 2:
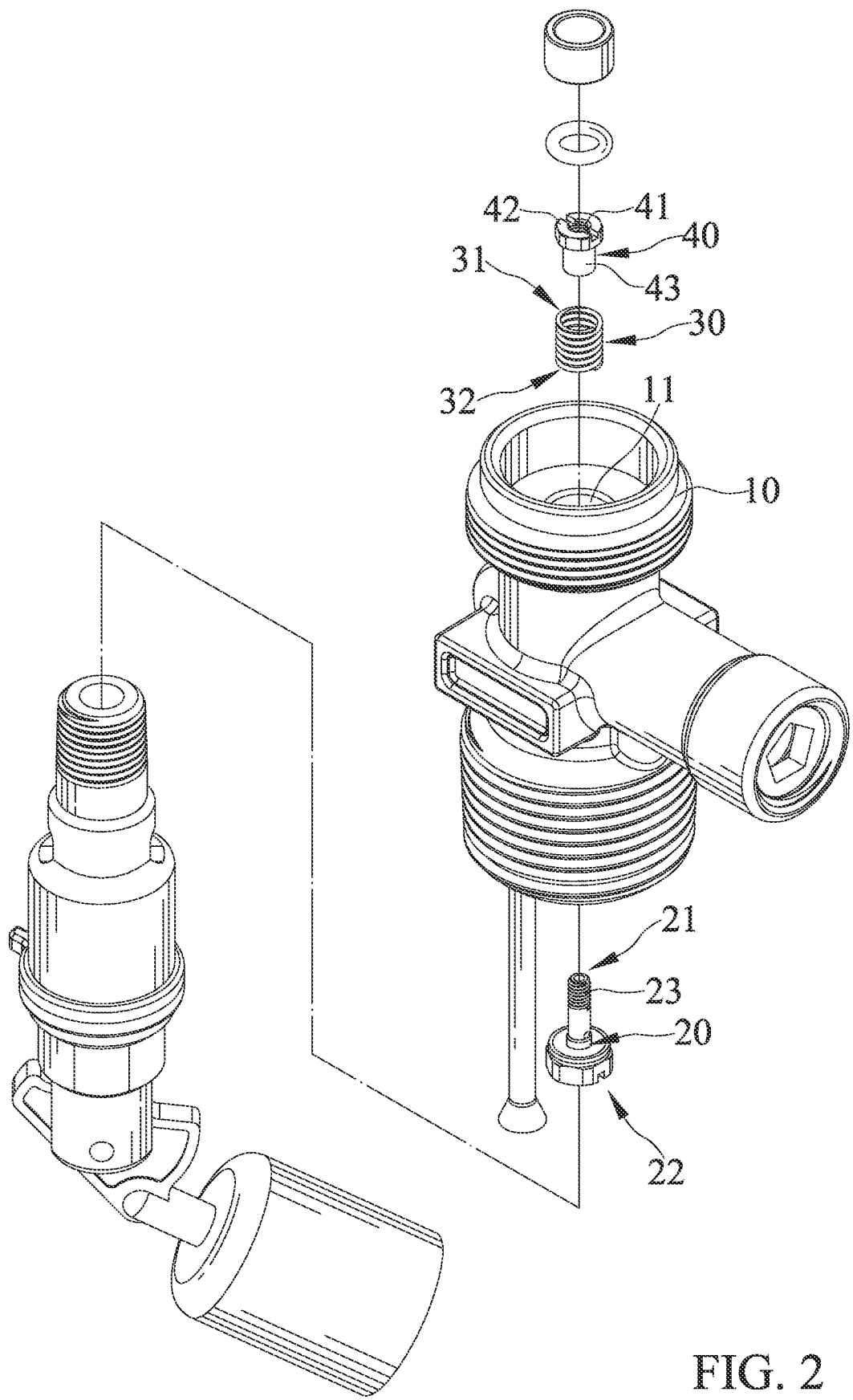
FIG. 2 is an exploded perspective view of the cylinder valve of FIG. 1.
Figure 3:
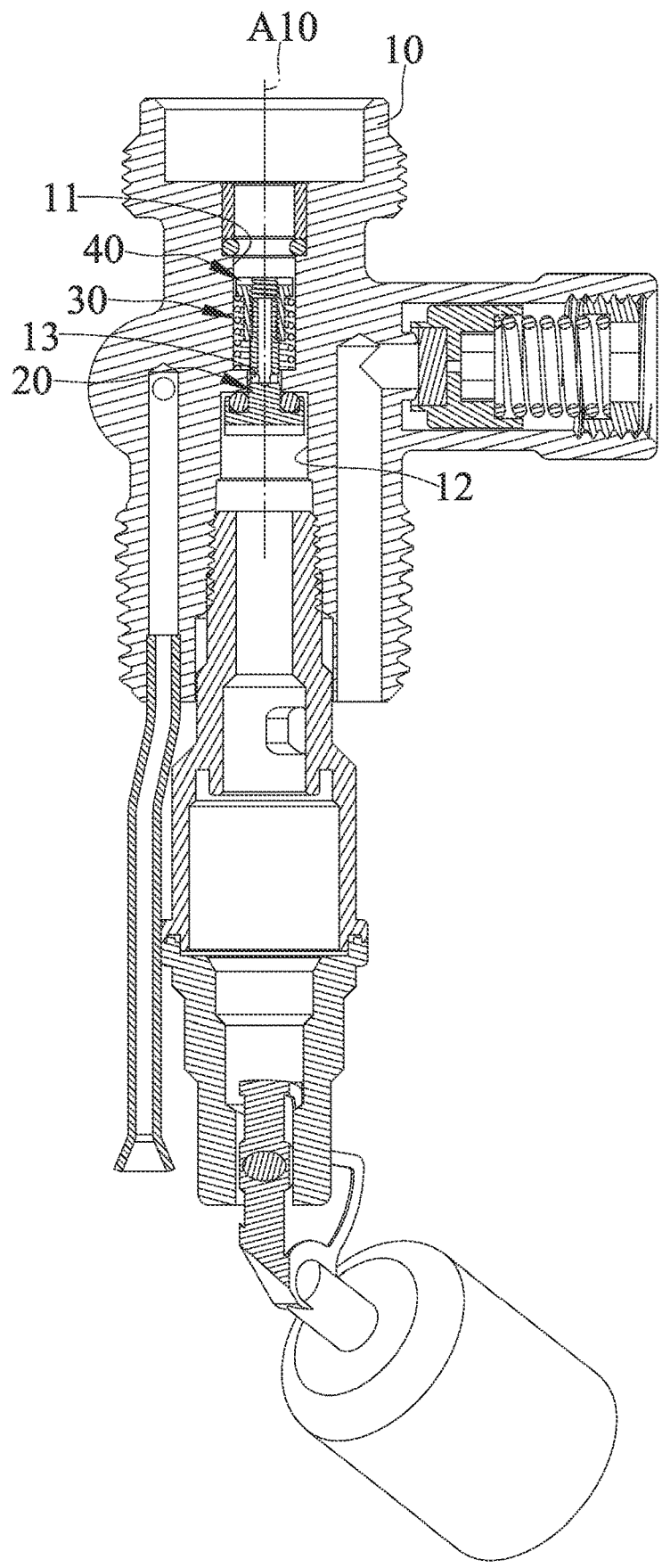
FIG. 3 is a cross sectional view of the cylinder valve of FIG. 1.
Figure 4:
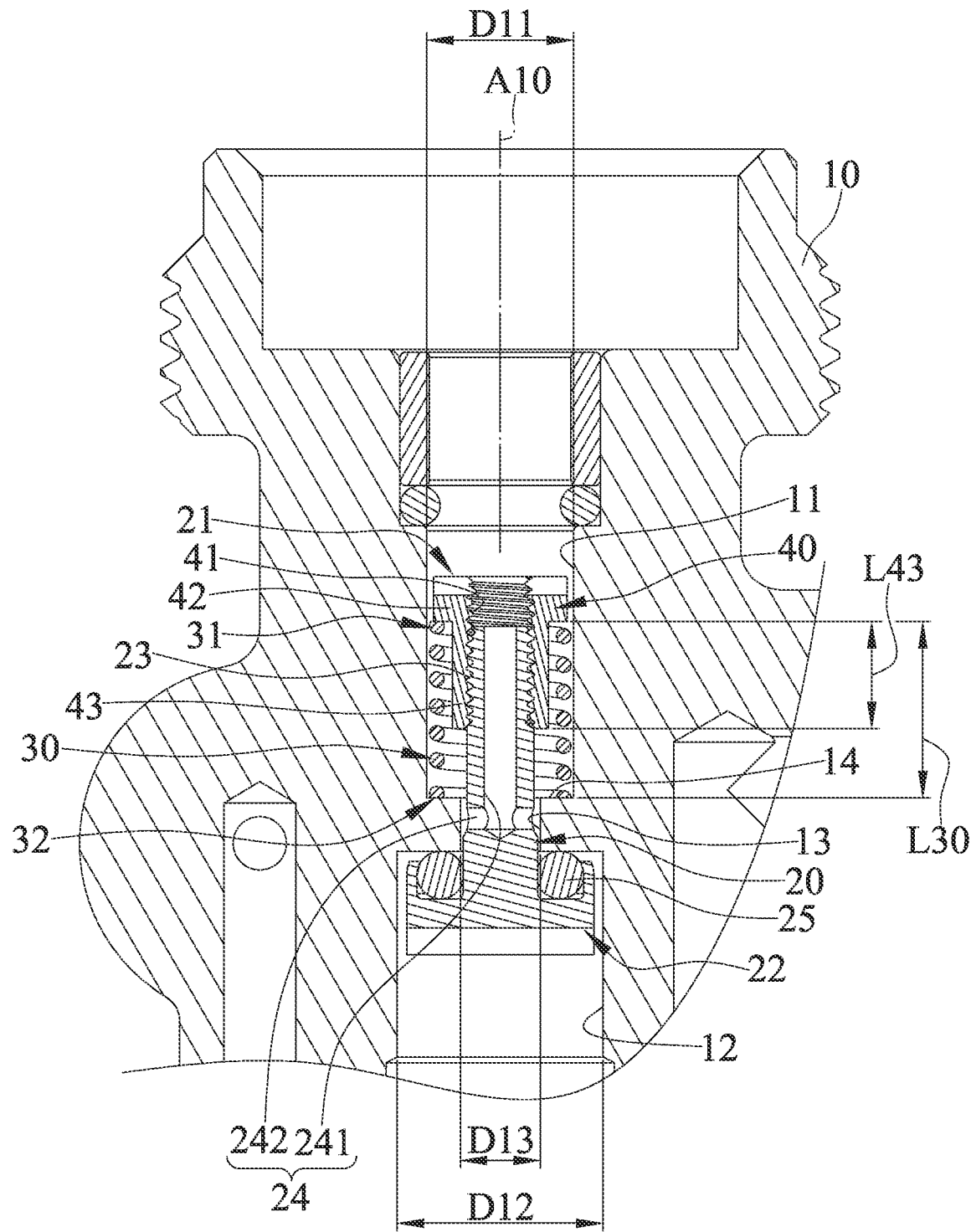
FIG. 4 is a partial enlarged view of the cylinder valve of FIG. 3, and shows the valve pin is in a closed position.
Figure 5:
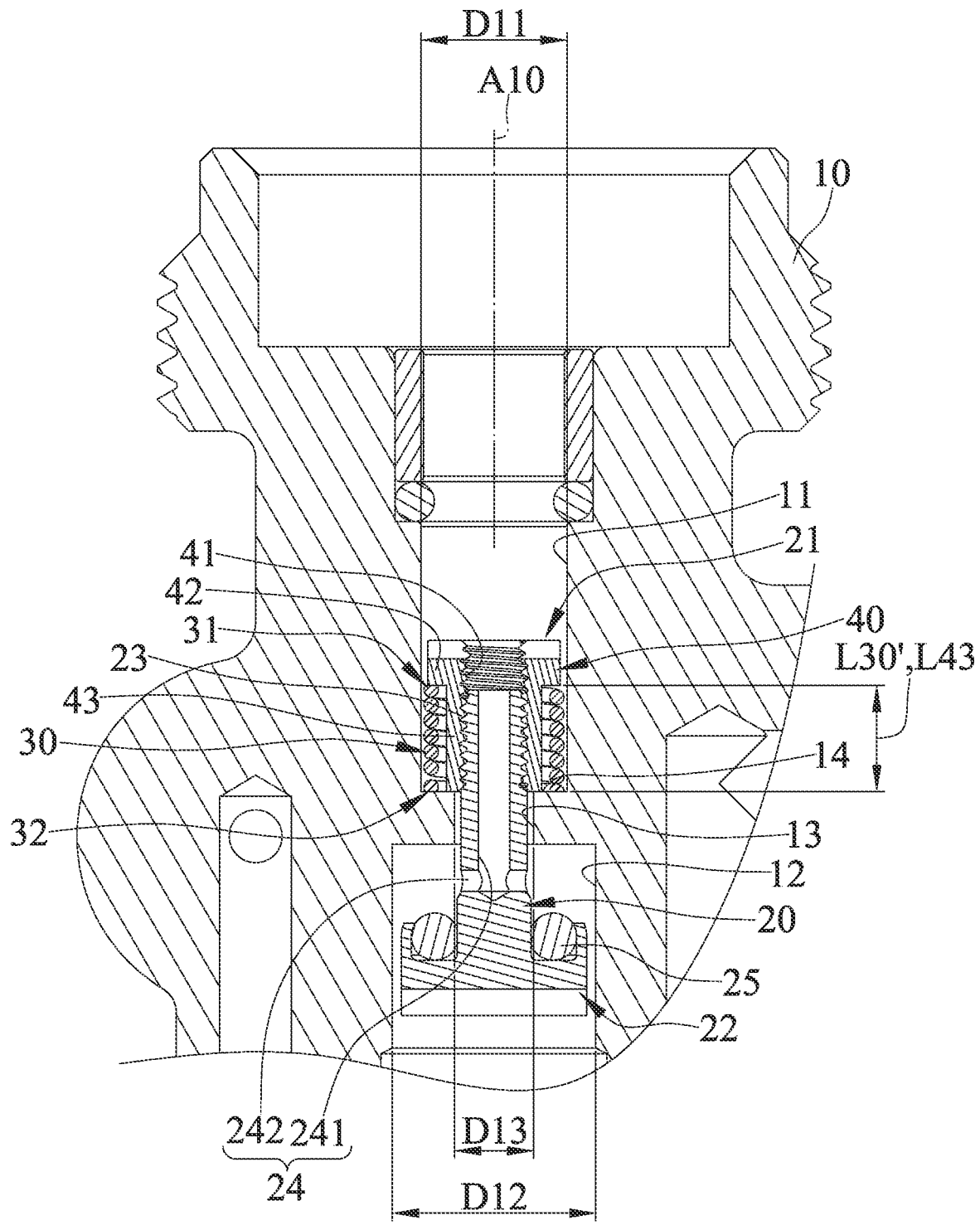
FIG. 5 is a continued view of FIG. 4, and shows the valve is in an open position.

FIGS. 1-5 show a cylinder valve of an embodiment according to the present invention. The cylinder valve includes a valve body 10, a valve pin 20 and an elastic biasing member 30. The valve body 10 includes a distal chamber 11, a proximal chamber 12 disposed along a main axis A10, and an intermediate chamber 13 extending along the main axis A10 between the distal chamber 11 and the proximal chamber 12. The valve pin 20 is movably arranged through the distal chamber 11, the proximal chamber 12 and the intermediate chamber 13 and is movable along the main axis A10 between a closed position (FIG. 4) and an open position (FIG. 5). The elastic biasing member 30 is arranged in the distal chamber 11 and is configured to elastically bias the valve pin 20 towards the closed position.

Further, the distal chamber 11 defines a first inner diameter D11 radially along the main axis A10. The proximal chamber 12 defines a second inner diameter D12 radially along the main axis A10. The intermediate chamber 13 defines a third inner diameter D13 radially along the main axis A10. The third inner diameter D13 is smaller than either the first inner diameter D11 or the second inner diameter D12 to form a shoulder 14 between the distal chamber 11 and the proximal chamber 12. At least one end of the elastic biasing member 30 elastically abuts against the shoulder 14 along the main axis A10.

The valve pin 20 defines a distal end 21 and a proximal end 22 opposite to the distal end 21 along the main axis A10. The distal end 21 is arranged in the distal chamber 11. The proximal end 22 is arranged in the proximal chamber 12. A limiting member 40 is connected to the distal end 21 of the valve pin 20. The elastic biasing member 30 defines a first end 31 and a second end 32 opposite to the first end 31 along the main axis A10. The first end 31 of the elastic biasing member 30 abuts against the limiting member 40, and the second end 32 of the elastic biasing member 30 abuts against the shoulder 14 to bias the valve pin 20 towards the closed position.

The valve pin 20 has a threaded portion 23 disposed on an outer peripheral surface of the distal end 21. The limiting member 40 has a threaded hole 41 extending along the main axis A10, and the threaded portion 23 of the valve pin 20 is threaded connected with the threaded hole 41 of the limiting member 40 to connect the limiting member 40 to the distal end 21.

Further, the limiting member 40 has a head 42 and a body 43 connected to the head 42 along the main axis A10. The threaded hole 41 penetrates through the head 42 and the body 43 along the main axis A10. The first end 31 of the elastic biasing member 30 abuts against the head 42 of the limiting member 40, and the body 43 abuts against the shoulder 14 when the valve pin 20 is in the open position.

The elastic biasing member 30 of the embodiment may be a compression spring. The elastic biasing member 30 defines an initial length L30 along the main axis A10. The body 43 defines a limiting length L43 along the main axis A10, and the limiting length L43 is smaller than the initial length L30, as shown in FIG. 4. Further, the elastic biasing member 30 is configured to have a compressed length L30' along the main axis A10 after being subjected to a force, and the limiting length L43 is equal to the compressed length L30', as shown in FIG. 5.

The valve pin 20 is provided with a vent hole 24, which includes a radial section 241 radially extending along the main axis A10 and an axial section 242 extending along the main axis A10. The radial section 241 communicates with the intermediate chamber 13, and communicates with the proximal chamber 12 when the valve pin 20 is in the open position. The axial section 242 communicates with the threaded hole 41 and the distal chamber 11. Further, the valve pin 20 is provided with a sealing member 25 at the proximal end 22, and the sealing member 25 abuts against the shoulder 14 when the valve pin 20 is in the closed position so that the distal chamber 11 and the proximal chamber 12 cannot communicate with each other.

As shown in FIG. 4, when the elastic bias member 30 elastically biases the valve pin 20 towards the closed position and the valve pin 20 is located at the closed position without an external force, the sealing member 25 abuts against the shoulder 14, so that the distal chamber 11 and the proximal chamber 12 cannot communicate with each other.

As shown in FIG. 5, when the elastic biasing member 30 is compressed by an external force from gas and the valve pin 20 moves from the closed position to the open position along the main axis A10, the body 43 abuts against the shoulder 14, limiting the compression stroke of the elastic biasing member 30 without excessive compression. At the same time, the sealing member 25 moves away from the shoulder 14 with the valve pin 20, allowing the proximal chamber 12 to communicate with the distal chamber 11 via the radial section 241, the axial section 242, and the threaded hole 41.

In summary, the elastic biasing member 30 is arranged in the distal chamber 11 and is configured to elastically bias the valve pin 20 towards the closed position. Thus, the assembly steps are significantly reduced as the valve pin 20, the elastic biasing member 30, and the limiting member 40 only need to be assembled in sequence. Furthermore, the limiting member 40 can prevent the elastic biasing member 30 from being excessively compressed.

Although specific embodiments have been illustrated and described, numerous modifications and variations are still possible without departing from the scope of the invention. The scope of the invention is limited by the accompanying claims.

The invention claimed is:

1. A cylinder valve comprising:
   a valve body including a distal chamber, a proximal chamber disposed along a main axis, and an intermediate chamber extending along the main axis between the distal chamber and the proximal chamber, wherein the distal chamber defines a first inner diameter radially along the main axis, wherein the proximal chamber defines a second inner diameter radially along the main axis, wherein the intermediate chamber defines a third inner diameter radially along the main axis, wherein the third inner diameter is smaller than either the first inner diameter or the second inner diameter to form a shoulder between the distal chamber and the proximal chamber;
   a valve pin movably arranged through the distal chamber, the proximal chamber and the intermediate chamber and movable along the main axis between a closed position and an open position, wherein the valve pin defines a distal end and a proximal end opposite to the distal end along the main axis, wherein the distal end is arranged in the distal chamber, wherein the proximal end is arranged in the proximal chamber, wherein a limiting member is connected to the distal end of the valve pin, wherein the valve pin has a threaded portion disposed on an outer peripheral surface of the distal end, wherein the limiting member has a threaded hole extending along the main axis, wherein the threaded portion of the valve pin is threadedly connected with the threaded hole of the limiting member, wherein the limiting member has a head and a body connected to the head along the main axis, wherein the threaded hole penetrates through the head and the body along the main axis; and
   an elastic biasing member arranged in the distal chamber and configured to elastically bias the valve pin towards the closed position, wherein the elastic biasing member defines a first end and a second end opposite to the first end along the main axis, wherein the first end of the elastic biasing member abuts against the head of the limiting member, wherein the second end of the elastic biasing member abuts against the shoulder, and wherein the body abuts against the shoulder when the valve pin is in the open position.

2. The cylinder valve as claimed in claim 1, wherein the valve pin is provided with a vent hole, wherein the vent hole includes a radial section radially extending along the main axis and an axial section extending along the main axis, wherein the radial section communicates with the intermediate chamber, and communicates with the proximal chamber when the valve pin is in the open position, and wherein the axial section communicates with the threaded hole and the distal chamber.

3. The cylinder valve as claimed in claim 1, wherein the valve pin is provided with a sealing member at the proximal end, and wherein the sealing member abuts against the shoulder when the valve pin is in the closed position.

4. The cylinder valve as claimed in claim 1, wherein the elastic biasing member is a compression spring.

5. The cylinder valve as claimed in claim 4, wherein the elastic biasing member defines an initial length along the main axis, wherein the body defines a limiting length along the main axis, and wherein the limiting length is smaller than the initial length.

6. The cylinder valve as claimed in claim 5, wherein the elastic biasing member is configured to have a compressed length along the main axis after being subjected to a force, and wherein the limiting length is equal to the compressed length.

\* \* \* \* \*